United States Patent
Fountain

(10) Patent No.: US 12,417,572 B2
(45) Date of Patent: Sep. 16, 2025

(54) DATA PROCESSING APPARATUS, DATA PROCESSING METHOD, PROGRAM, AND DATA PROCESSING SYSTEM

(71) Applicant: TELEXISTENCE INC., Tokyo (JP)

(72) Inventor: Jade Fountain, Tokyo (JP)

(73) Assignee: Telexistence Inc., Tokyo (JP)

( * ) Notice: Subject to any disclaimer, the term of this patent is extended or adjusted under 35 U.S.C. 154(b) by 155 days.

(21) Appl. No.: 18/286,132

(22) PCT Filed: Apr. 11, 2022

(86) PCT No.: PCT/JP2022/017459
§ 371 (c)(1),
(2) Date: Oct. 8, 2023

(87) PCT Pub. No.: WO2022/220208
PCT Pub. Date: Oct. 20, 2022

(65) Prior Publication Data
US 2024/0185492 A1    Jun. 6, 2024

(30) Foreign Application Priority Data
Apr. 14, 2021   (JP) ................................. 2021-068174

(51) Int. Cl.
*G09G 5/00* (2006.01)
*G06T 5/50* (2006.01)
*G06T 11/60* (2006.01)

(52) U.S. Cl.
CPC ................ *G06T 11/60* (2013.01); *G06T 5/50* (2013.01); *G06T 2207/20221* (2013.01)

(58) Field of Classification Search
CPC ................ G09G 5/14; G09G 2340/10; G09G 2340/125; G06T 11/60; G06T 15/503;
(Continued)

(56) References Cited

U.S. PATENT DOCUMENTS 9,734,427 B2 *  8/2017  Lin ..................... G06V 10/757
2011/0216179 A1   9/2011  Dialameh et al.
(Continued)

FOREIGN PATENT DOCUMENTS

JP    2005323310 A    11/2005
JP    2012175136 A     9/2012
(Continued)

OTHER PUBLICATIONS

International Search Report from the priority application PCT/JP2022/017459, mailed on Jun. 28, 2022.
(Continued)

*Primary Examiner* — Gordon G Liu
(74) *Attorney, Agent, or Firm* — MEAGHER EMANUEL LAKS GOLDBERG & LIAO, LLP

(57) ABSTRACT

A data processing apparatus includes a control unit. The control unit is configured to obtain capture image data generated based on image capturing by a camera provided for a robot, combine at least a portion of display image data of the capture image data obtained at a first time point and at least a portion of past capture image data of the capture image data obtained at a second time point before the first time point to generate composite image data having a wider angle of view than the display image data, and display the composite image data on a display device viewable by an operator of the robot.

13 Claims, 9 Drawing Sheets

(58) Field of Classification Search
CPC . G06T 2207/30196; G06T 2207/10016; G06T 7/13; G06T 7/50; G06T 2200/24; G06T 2207/10024; G06T 2207/20221; G06T 11/203; G06T 11/00; G06T 1/60; G06T 7/248; G06T 7/74; G06T 5/50; G06F 3/017; G06V 20/56; H04N 23/69; H04N 23/60; G02B 27/001; G02B 2027/0138; G02B 2027/014; B25J 9/1689; B25J 9/1697
USPC ........................................................ 345/629
See application file for complete search history.

(56) References Cited

U.S. PATENT DOCUMENTS

| | | | | |
|---|---|---|---|---|
| 2016/0269631 | A1* | 9/2016 | Jiang | G06T 3/4038 |
| 2019/0200844 | A1* | 7/2019 | Shelton, IV | H04L 63/123 |

FOREIGN PATENT DOCUMENTS

| | | |
|---|---|---|
| JP | 2013520757 A | 6/2013 |
| JP | 2016167688 A | 9/2016 |

OTHER PUBLICATIONS

Machine English translation of the Written Opinion of the International Searching Authority from the priority application PCT/JP2022/017459, mailed on Jun. 28, 2022.

\* cited by examiner

| $(\theta, \phi)$ | | | | | |
|---|---|---|---|---|---|
| (001,001) | (001,002) | (001,003) | ... | (360,360) | |
| 001001 | 001002 | 001003 | ... | 360360 | |

FIG. 5

DATA PROCESSING APPARATUS, DATA PROCESSING METHOD, PROGRAM, AND DATA PROCESSING SYSTEM

TECHNICAL FIELD

The present disclosure relates to a data processing apparatus, a data processing method, a program, and a data processing system.

BACKGROUND

JP2020-040155 discloses a technique of displaying a capture image generated by an image capture device provided for a robot, on a terminal used by an operator who operates the robot by remote control.

SUMMARY

There have been problems that, in the case where an operator operates a robot while viewing a capture image generated by an image capture device provided for the robot, if a range where the image capture device provided for the robot can capture is narrower than a range of the field of view of the operator, it is difficult for the operator to operate the robot.

The present disclosure has been made taking this point into account, and an object of the present disclosure is to provide a data processing apparatus, etc. which make it possible for an operator of a robot to operate the robot easily.

A data processing apparatus according to an aspect of the present invention includes a control unit. The control unit is configured to obtain capture image data generated based on image capturing by an image capture device provided for a robot, combine at least a portion of display image data of the capture image data obtained at a first time point and at least a portion of past capture image data of the capture image data obtained at a second time point before the first time point, to generate composite image data having a wider angle of view than the display image data, and display the composite image data on a display device viewable by an operator of the robot.

According to the present disclosure, a data processing apparatus, etc. which make it possible for an operator of a robot to operate the robot easily are provided.

BRIEF DESCRIPTION OF THE DRAWINGS

FIG. 5 is a diagram showing a method of storing the capture image data in a memory unit;

DETAILED DESCRIPTION

Figure 1:
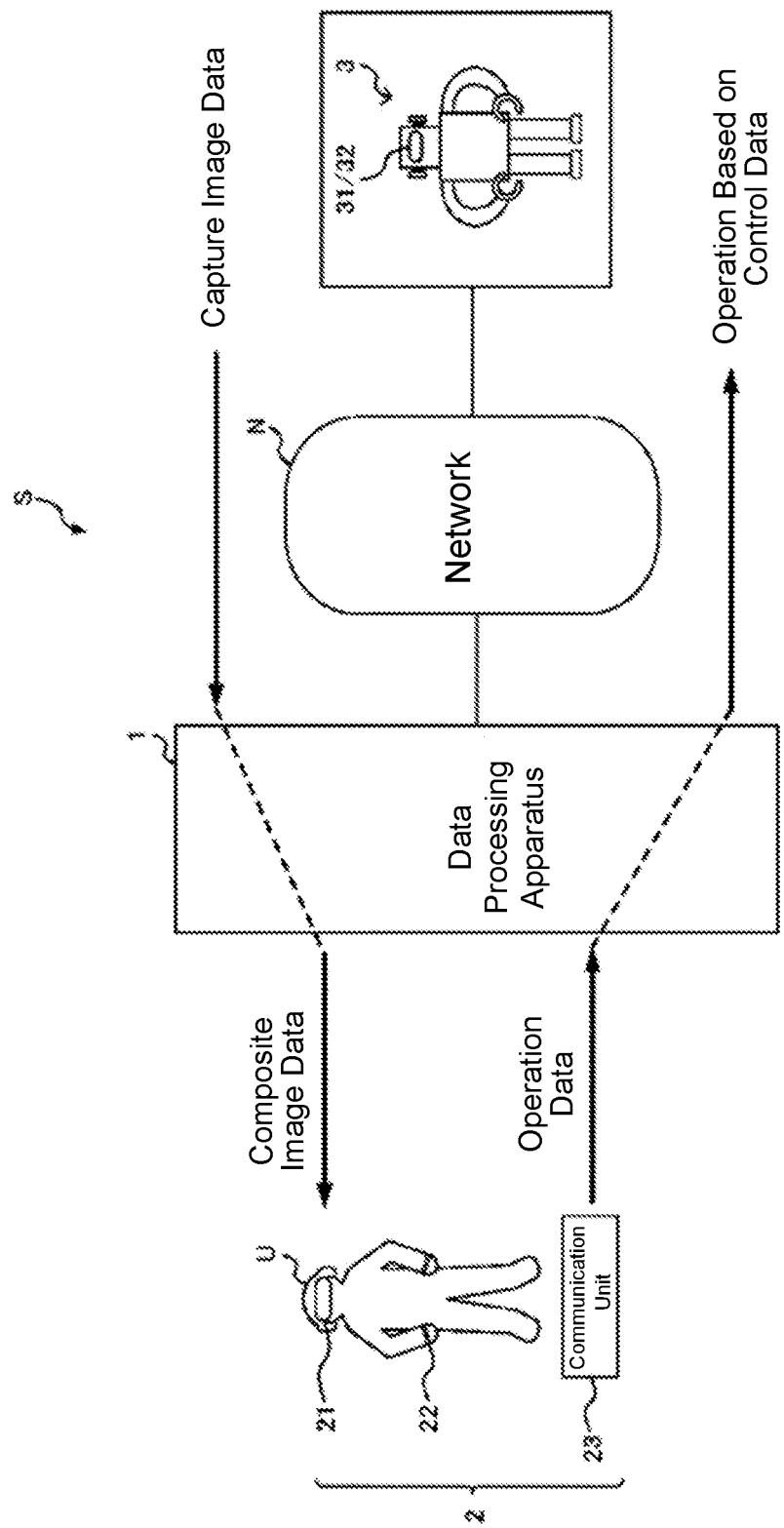
FIG. 1 is a diagram showing the overview of a data processing system.

FIG. 1 is a diagram showing the overview of a data processing system S. The data processing system S is a system which provides a telexistence environment where an operator U can operate an object at a remote location in real time while the operator U can feel as if the object were located nearby.

The data processing system S includes a data processing apparatus 1, an operation controller 2, and a robot 3. The data processing apparatus 1 is an apparatus for controlling the robot 3 in correspondence with operation of the operator U performed at the operation controller 2. For example, the data processing apparatus 1 is a computer. The data processing apparatus 1 may be provided in a room where the operator U or the robot 3 is present. Alternatively, the data processing apparatus 1 may be provided at a position which is different from the position where the operator U is present and the position where the robot 3 is present.

The operation controller 2 is a device attached to the operator U. The operation controller 2 includes a display device 21, an operation device 22, and a communication unit 23. The display device 21 includes a display for displaying an image based on composite image data generated by the data processing apparatus 1. The image on the display is viewable by the operator U. For example, the display device 21 is in a form of goggles. For example, the image displayed on the display device 21 is a celestial image corresponding to 360 degrees (all directions).

The robot 3 is operated based on control data received from the data processing apparatus 1 through a network N. The robot 3 includes an image capture device for generating capture image data (hereinafter referred to as the "camera 31"), and an image transmission unit 32 for transmitting the capture image data generated by the camera 31 to the data processing apparatus 1. Further, the robot 3 transmits robot status data to the operation controller 2 through the data processing apparatus 1. The robot status data includes at least any one of haptic data indicating a sense of touch detected by the robot 3, sound data indicating a sound collected by the robot 3, or joint state data indicating a state of joints of the robot 3. As an example, in a store where a large number of products arranged on racks are sold, the robot 3 according to the present embodiment performs a task of arranging products on the racks in correspondence with operation of the operator U. However, the location where the robot 3 is provided and what tasks the robot 3 performs are not limited.

The data processing apparatus 1 obtains capture image data generated by the robot 3 by capturing images in front of the robot 3 using the camera 31, and displays the obtained capture image data on the display device 21 of the operation controller 2. The angle of view of the capture image data generated by the robot 3 is narrower than the field of view of the operator U. Therefore, if only the capture image data is displayed on the display device 21, operability of the operator U is poor. So, the data processing apparatus 1 combines the capture image data generated by the robot 3 and past capture image generated in the past, corresponding to an area around the capture image area corresponding to the capture image data, to generate composite image data. The data processing apparatus 1 displays the composite image data on the operation controller 2. Thus, it is possible to improve operability of the operator U.

The display device 21 has a sensor for detecting an angle of the display device 21 relative to a reference orientation (hereinafter also referred to as the "device angle"). For example, the reference orientation is an orientation of the display device 21 in a state where the display device 21 is attached to the operator U oriented in a predetermined orientation. For example, the reference orientation is an orientation when operation of the display device 21 is started, or when the display device 21 is reset. The display device 21 detects an angle difference between the reference orientation and the orientation of the display device 21 as the device angle.

Figure 2:
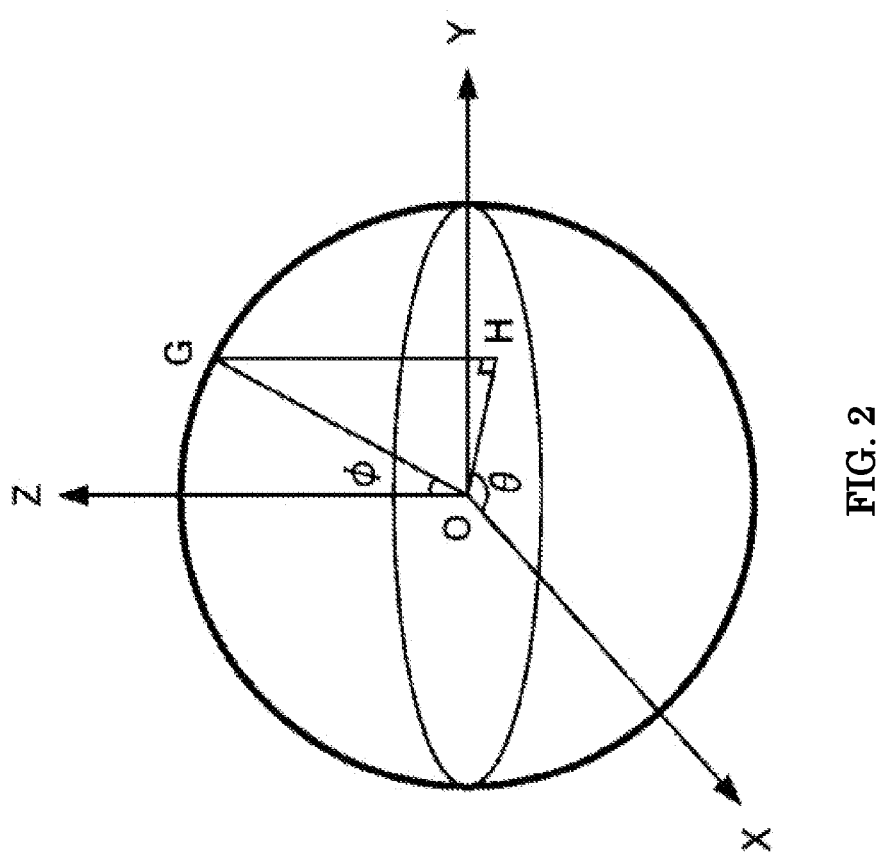
FIG. 2 is a view illustrating a device angle of a display device.

The device angle of the display device 21 is represented, for example, by combination of two angles in a spherical coordinate system in three dimensional space. FIG. 2 is a view illustrating the device angle of the display device 21. The device angle of a position G on a surface of a sphere shown in FIG. 2 is represented as (θ, φ). θ is an angle between a straight line connecting a position H which corresponds to the position G projected on the XY plane and the origin O, and the X-axis direction. φ is an angle between the Z-axis direction and the direction of a straight line connecting the origin O and the position G.

The positive orientation in the X-axis direction corresponds to the orientation toward the front side of the display device 21 when operation of the display device 21 is started (i.e., the front side of the operator U), and the device angle of the display device 21 is represented as (0, 0) in the state where the operator U faces the front side of the display device 21. In the state where the operator U faces exactly left (i.e., the operator U is oriented in the positive Y-axis direction), the device angle of the display device 21 is represented as (90, 0).

The display device 21 generates head operation data indicating the device angle of the display device 21 relative to the reference orientation. The display device 21 notifies the head operation data to the communication unit 23 at predetermined time intervals. The predetermined time interval is defined, for example, based on the velocity at which the robot 3 can change the angle of the head of the robot 3. The greater the velocity at which the robot 3 can change the angle of the head of the robot 3 becomes, the shorter the predetermined time interval becomes. Since the time interval at which the display device 21 notifies the device angle corresponds to the velocity at which the robot 3 can change the angle of the head of the robot 3, there is no need to detect the device angle at a frequency higher than necessary. Therefore, it is possible to suppress power consumption of the operation controller 2.

The operation device 22 is a device used by the operator U to operate hands and arms of the robot 3, and has sensors for detecting movement of the hands and arms of the operator U. The operation device 22 generates hand/arm operation data indicating the movement of the hands and arms of the operator U. The operation device 22 notifies the generated hand/arm operation data to the communication unit 23. The operation device 22 may accept operation to move the robot 3 back and forth or left and right. Further, the operation device 22 also has elements for generating heat, pressure or vibration, etc. in correspondence with the state of the robot 3 to enable the operator U to sense the state of the robot 3.

The communication unit 23 has a communication controller which transmits operation data based on operation content by the operator U to the data processing apparatus 1 and receives composite image data from the data processing apparatus 1. The communication unit 23 synchronizes, for example, head operation data notified from the display device 21 and hand/arm operation data notified from the operation device 22. Further, the communication unit 23 transmits data including the synchronized head operation data and hand/arm operation data to the data processing apparatus 1 at predetermined time intervals. Further, the communication unit 23 inputs the composite image data received from the data processing apparatus 1 to the display device 21. The communication unit 23 may transmit operation data for moving the robot 3 forward, backward, leftward, or rightward to the data processing apparatus 1. The communication unit 23 may be included in either the display device 21 or the operation device 22, or the communication unit 23 may be placed in a casing which is different from the display device 21 and the operation device 22.

The robot 3 changes the orientation of the head of the robot 3 to the same angle as the angle of the display device 21, based on head control data. The head control data has been generated by the data processing apparatus 1 based on the head operation data transmitted from the operation controller 2. Further, the robot 3 moves the hands and arms of the robot 3 in the same manner as the hands and arms of the operator U, based on the hand/arm control data. The hand/arm control data has been generated by the data processing apparatus 1 based on the hand/arm operation data transmitted from the operation controller 2.

For example, the camera 31 is provided on the head, and generates capture image data by capturing images in front of the robot 3. The image transmission unit 32 includes a communication controller for transmitting the capture image data through the network N. While FIG. 1 illustrates a case where the camera 31 has the image transmission unit 32, the position where the image transmission unit 32 is provided is not limited.

The orientation of the optical axis of camera 31 changes as the orientation of the head of the robot 3 changes based on the head control data, and as a result, the image capture area changes. In the following description, the angle of orientation of a straight line connecting the center of rotation of the head of the robot 3 (corresponding to the origin in FIG. 2) and the center position of an area to be captured, relative to the orientation toward the front side, will be referred to as the "image capture angle". The robot 3 moves the head of the robot 3 in a manner that the angle of the head of the operator U indicated by the head operation data (i.e., the device angle) and the image capture angle match.

Hereinafter, the process flow in the data processing system S will be described briefly with reference to FIG. 1. As described above, the operation controller 2 generates operation data in correspondence with movement of the head, hands, and arms of the operator U, and transmits the operation data to the data processing apparatus 1. The data processing apparatus 1 generates control data for operating the robot 3 based on operation data, and transmits the control data to the robot 3. The robot 3 operates based on the control data received from the data processing apparatus 1.

While the robot 3 is in operation, the robot 3 transmits the capture image data generated by the camera to the data processing apparatus 1 at predetermined time intervals (e.g., every 5 milliseconds). The robot 3 may associate information indicating the angle of the head of the robot 3 at the time point the capture image data was generated with the capture image data, and transmit the capture image data to the data processing apparatus 1.

The data processing apparatus 1 combines the capture image data received from the robot 3 and the past capture image data corresponding to the area around the image capture area of the capture image data to generate composite image data, and transmits the composite image data to the operation controller 2. The display device 21 displays the composite image data. Since the composite image data includes image data of an area wider than the area the robot 3 can capture, the operator U can have the same field of view as if the operator U were actually looking at the worksite where the robot 3 is working. Thus, it becomes easy for the operator U to operate the robot 3.

Figure 3A:
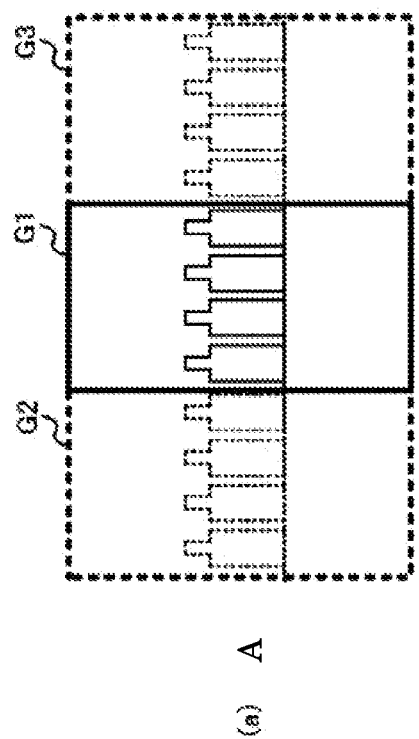
FIGS. 3A and 3B are views showing the relationship between capture image data and composite image data.
Figure 3B:
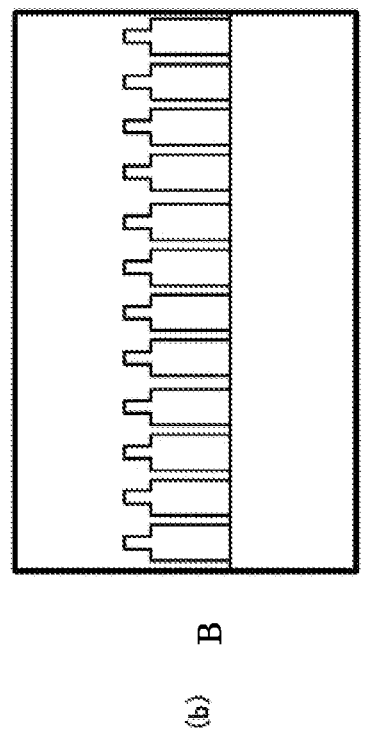

FIGS. 3A and 3B are views showing the relationship between the capture image data and the composite image data. An image G1 in FIG. 3A is an image based on the display image data generated by the robot 3 at a first time point 1, and shows a state where bottles are arranged on a rack. An image G2 and an image G3 in FIG. 3A are images based on capture image data corresponding to image capture areas that are adjacent to both sides of the image capture area of the display image data, among a plurality of pieces of past capture image data generated by the robot 3 at a second time point before the first time point.

FIG. 3B shows a composite image generated by combining the display image data G1, the past capture image data G2, and the past capture image data G3. In comparison with the case where operator U views the image G1 shown in FIG. 3A, when the operator U views the composite image shown in FIG. 3B, the operator U has a wide field of view. Thus, it becomes easy for the operator U to work using the robot 3.

Hereinafter, the structure and operation of the data processing apparatus 1 will be described in detail.

Figure 4:
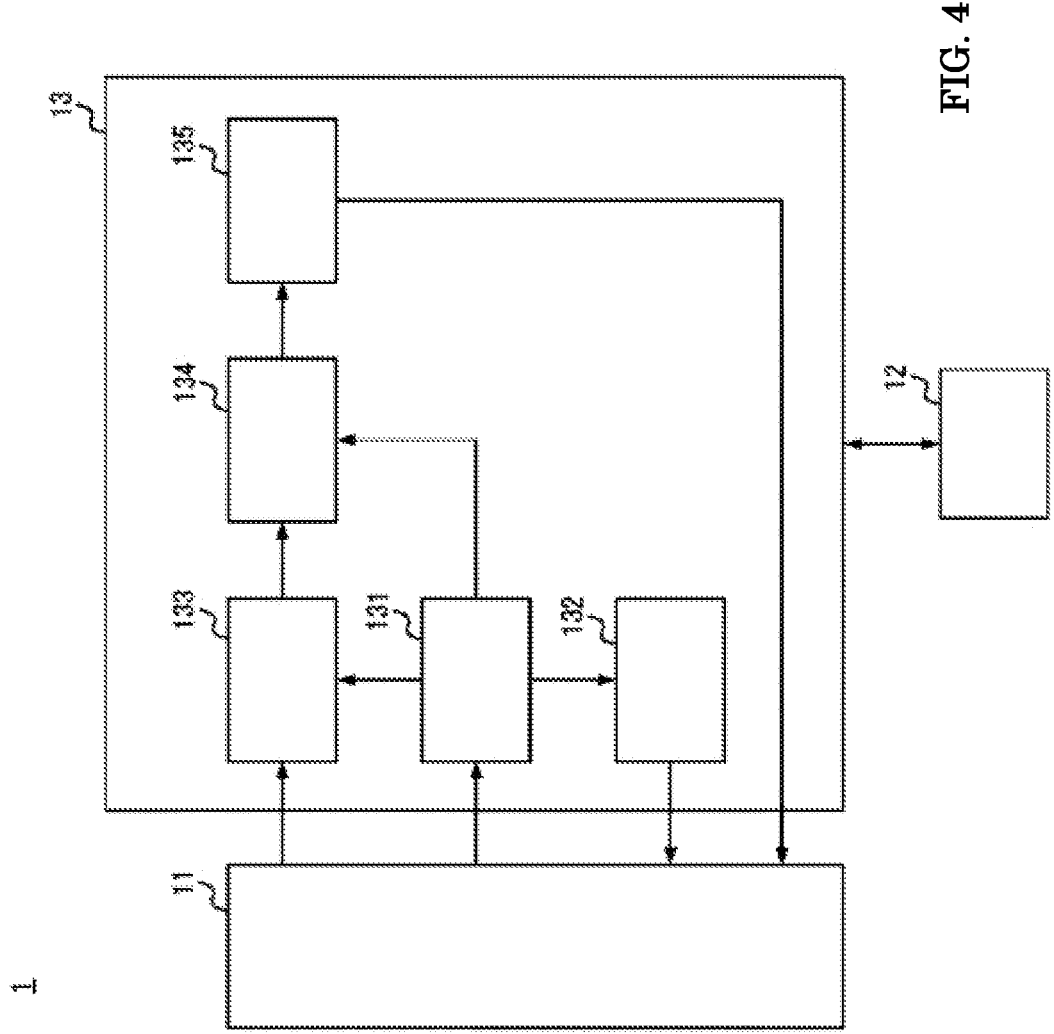
FIG. 4 is a diagram showing structure of a data processing apparatus.

FIG. 4 is a diagram showing structure of the data processing apparatus 1. The data processing apparatus 1 includes a communication unit 11, a memory unit 12, and a control unit 13. The control unit 13 includes an operation data acquisition unit 131, a control data generation unit 132, an image data acquisition unit 133, a composition unit 134, and a display control unit 135.

The communication unit 11 has a communication interface for transmitting various items of data between the operation controller 2 and the robot 3 through the network N. The communication unit 11 inputs operation data received, e.g., from the operation controller 2, to the operation data acquisition unit 131. Further, the communication unit 11 inputs capture image data received from the robot 3, to the image data acquisition unit 133. Further, the communication unit 11 transmits the composite image data inputted from the display control unit 135 to the operation controller 2.

The memory unit 12 has a storage medium such as ROM (Read Only Memory), RAM (Random Access Memory) and SSD (Solid State Drive). The memory unit 12 stores programs to be executed by the control unit 13. The memory unit 12 also temporarily stores the capture image data received from the robot 3. The memory unit 12 stores the angle of the display device 21 when the capture image data obtained by the image data acquisition unit 133 was captured as the device angle with the capture image data, and the capture image data associated with the device angle. Since the angle of display device 21 is equivalent to the angle of the head of the robot 3, the memory unit 12 may store the angle of the head of the robot 3 when the capture image data was generated, and the capture image data associated with the angle of the head of the robot 3.

FIG. 5 is a diagram showing a method of storing the capture image data in the memory unit 12. In FIG. 5, the device angle (θ, φ) of the display device 21 at the time point the robot 3 generated the capture image data is associated with a file name of the capture image data. Each time the communication unit 11 receives new capture image data from the robot 3, the capture image data stored in the memory unit 12 associated with the angle of the display device 21 at the time point the received capture image data was generated is updated. The angle of the display device 21 and the angle of the head of the robot 3 can be any angle corresponding to any orientation in three dimensional space. Therefore, the capture image data corresponding to 360 degrees (all orientations) is stored in the memory unit 12.

Referring back to FIG. 4, the control unit 13 will be described. For example, the control unit 13 includes a CPU (Central Processing Unit) as a processor. The control unit 13 executes programs stored in the memory unit 12, to function as the operation data acquisition unit 131, the control data generation unit 132, the image data acquisition unit 133, the composition unit 134, and the display control unit 135.

The operation data acquisition unit 131 obtains operation data indicating operation content of the operator U through the communication unit 11. The operation data acquisition unit 131 obtains, for example, head operation data indicating the angle of the display device 21 and hand/arm operation data indicating movement of the hands and arms of the operator U. The operation data acquisition unit 131 inputs the obtained operation data to the control data generation unit 132, the image data acquisition unit 133, and the composition unit 134.

The control data generation unit 132 generates control data for operating the robot 3, based on the operation data inputted from the operation data acquisition unit 131. For example, the control data generation unit 132 may generate control data by adding or subtracting a predetermined correction value to or from a value indicated by the operation data. The control data generation unit 132 transmits the generated control data to the robot 3 through the communication unit 11.

The image data acquisition unit 133 obtains capture image data generated by image capturing by the camera 31 provided for the robot 3, through the communication unit 11. The image data acquisition unit 133 stores the obtained capture image data in the memory unit 12. As shown in FIG. 5, for example, the image data acquisition unit 133 associates the capture image data with the angle of the display device 21 indicated by the operation data at the time point the capture image data was obtained, and stores the capture image data associated with the angle of the display device 21 in the memory unit 12.

When the image data acquisition unit 133 obtains the capture image data, the image data acquisition unit 133 updates the capture image data stored in the memory unit 12 associated with the angle of the display device 21 indicated by the operation data at the time point the capture image data was captured, to the capture image data obtained by the image data acquisition unit 133. That is, in the case where the image data acquisition unit 133 obtains the capture image data of the angle of the capture image data which has already been stored in the memory unit 12, the image data acquisition unit 133 updates the capture image data stored in the memory unit 12 to newly obtained capture image data. It should be noted that, in the case where the capture image data is associated with the angle of the head of the robot 3 at the time point the capture image data was generated by the robot 3, the image data acquisition unit 133 may associate the capture image data with the angle of the head of the robot 3, and store the capture image data associated with the angle of the head of the robot 3 in the memory unit 12.

In this regard, if the position of the robot 3 changes, the area included in the capture image data generated by the robot 3 changes. Therefore, after the position of the robot 3 changes, if a plurality of pieces of the capture image data in the past are combined, mismatching occurs at the borders between the plurality of pieces of combined capture image data. So, in the case where the position of the robot 3 moved, the image data acquisition unit 133 may initialize the capture image data stored in the memory unit 12.

For example, in the case where operation to move the position of the robot 3 is performed based on the movement operation data obtained by the operation data acquisition unit 131, the image data acquisition unit 133 initializes the capture image data stored in the memory unit 12. For example, the image data acquisition unit 133 deletes the capture image data stored in the memory unit 12 to initialize the capture image data. The image data acquisition unit 133 may not delete the capture image data, and may delete the file name of the capture image data associated with the device angle as shown in FIG. 5. In the case where the position of the robot 3 moved, the image data acquisition unit 133 initializes the capture image data to prevent the composite image having mismatch from being displayed on the display device 21.

Further, even if the robot 3 is present at the same position, after elapse of a long period of time, the environment around the robot 3 may change. If a plurality of pieces of the past capture image data are combined even though the environment around the robot 3 has changed, mismatch occurs at the borders between the plurality of pieces of combined capture image data. So, in the case where the operator U finishes operation of the robot 3, or after elapse of predetermined time, the image data acquisition unit 133 may initialize the capture image data stored in the memory unit 12. The predetermined time is the length of the time that the environment around the position of the robot 3 may change, and, for example, the time is one minute.

Whether or not the environment around the robot 3 changes may depend on the time, the date, or the day of the week. Therefore, after the elapse of the predetermined time associated with any of the time, the date, or the day of the week, the image data acquisition unit 133 may initialize the capture image data stored in the memory unit 12.

Further, in the case where the image data acquisition unit 133 receives an instruction to initialize the capture image data stored in the memory unit 12, inputted by the operator U at the operation device 22, the image data acquisition unit 133 may initialize the capture image data stored in the memory unit 12. Since the image data acquisition unit 133 operates in this manner, at the time point the operator U starts to sense deterioration of the quality of the composite image data, it is possible to initialize the capture image data by the will of the operator U.

Further, while the operator U is not operating the robot 3, the environment around the robot 3 may change or someone may move the robot 3. Therefore, at the time point the operator U resumes operation of the robot 3, it is assumed that the capture image data stored in the memory unit 12 does not match with the capture image data generated by the robot 3. Therefore, in the case where the operator U operated to log out to finish the operation of the robot 3 or the power of the robot 3 is turned off, the image data acquisition unit 133 may initialize the capture image data stored in the memory unit 12.

The composition unit 134 generates composite image data as shown in FIG. 3B. Specifically, the composition unit 134 generates composite image data of a wider angle of view than the display image data by combining at least a portion of the display image data obtained by the image data acquisition unit 133 at the first time point and at least a portion of the past capture image data of the capture image data obtained by the image data acquisition unit 133 at the second time point before the first time point. The display image data of at least a portion of the capture image data is the capture image data corresponding to at least a portion of a capture area corresponding to the capture image data. The display image data may be the same as the capture image data obtained by the image data acquisition unit 133 at the first time point.

The composition unit 134 combines display image data based on the capture image data generated by image capturing at a first image capture angle by the camera of the robot 3 and past capture image data based on the capture image data generated by image capturing at a second image capture angle which is different from the first image capture angle to generate composite image data. For example, the first image capture angle is an angle of the head of the robot 3 at the time point when the image G1 shown in FIG. 3A is generated, and the second image capture angle is an angle of the head of the robot 3 at the time point when the image G2 or the image G3 shown in FIG. 3A is generated. In the case where the angle of view in the left-right direction in one capture image data is, for example, 30 degrees, and the first image capture angle corresponding to the image G1 is (0, 0), the second image capture angle corresponding to the image G2 is (30, 0), and the second image capture angle corresponding to the image G3 is (330, 0).

The composition unit 134 selects past capture image data from a plurality of pieces of past capture image data stored in the memory unit 12, based on the relationship between the angle of the display device 21 indicated by operation data obtained through the operation data acquisition unit 131 and a plurality of device angles corresponding to the plurality of pieces of capture image data stored in the memory unit 12. Specifically, the composition unit 134 selects the past capture image data corresponding to the device angle which is different from the angle of the display device 21 indicated by the operation data, by the angle corresponding to the angle of view of the display image data.

The composition unit 134 calculates an angle by adding or subtracting the angle of view of the capture image (e.g., 30 degrees) from or to the angle of the display device 21 indicated by the head operation data, and selects the past capture image data stored in the memory unit 12, associated with the device angle corresponding to the calculated angle. As described in the above example, in the case where the device angle of the display device 21 is (0, 0), the composition unit 134 selects the left past capture image data associated with (30, 0) calculated by adding (0, 0) to (30, 0), and the right past capture image data (330, 0) calculated by subtracting (30,0) from (0, 0).

The composition unit 134 may further select past capture image data corresponding to the upper, lower, diagonally upward, and diagonally downward angles of the display image data. If the angle of view in the vertical direction is 60 degrees, the composition unit 134 selects the capture image data stored in the memory unit 12 associated with the device angle (0, 60) as the upper past capture image data. The composition unit 134 selects the capture image data stored in the memory unit 12 associated with the device angle (0, 300) as the lower past capture image data. The composition unit 134 selects the capture image data stored in the memory unit 12 associated with the device angle (30, 60) as the upper left past capture image data.

In the example shown in FIGS. 3, only the images G1, G2, and G3 are shown. However, as described above, the memory unit 12 stores capture image data corresponding to 360 degrees (all directions). Therefore, the composition unit 134 selects the plurality of pieces of capture image data to be used to generate the composite image data from the plurality of pieces of capture image data stored in the memory unit 12 associated with each of the plurality of angles corresponding to all directions, based on the device angle or the image capture angle corresponding to the capture image data obtained by the image data acquisition unit 133. The composition unit 134 combines the selected plurality of pieces of capture image data to generates celestial image data corresponding to 360 degrees (all directions).

As described above, it should be noted that the angle of the display device 21 is equivalent to the angle of the head of the robot 3. Therefore, the composition unit 134 may use the image capture angle corresponding to the angle of the head of the robot 3 instead of the angle of the display device 21 to select the past capture image data used to generate the composite image data.

In this case, the composition unit 134 selects past capture image data from the plurality of pieces of image data stored in the memory unit 12 based on the relationship between the first image capture angle at the first time point when the display image data was generated and the plurality of image capture angles corresponding to the plurality of pieces of image data stored in the memory unit 12. Specifically, as in the case of using the device angle of the display device 21, the composition unit 134 selects the past capture image data corresponding to an image capture angle which is different from the first image capture angle by an angle corresponding to the angle of view of the display image data.

The composition unit 134 may generate composite image data in a form which enables distinguishing between the display image data and the past capture image data. For example, the composition unit 134 uses color image data as the display image data and monochrome image data as the past capture image data, to enable the operator U to distinguish the display image data from the past capture image data. The composition unit 134 may generate composite image data having the luminance of the display image data higher than the luminance of the past capture image data. The composition unit 134 may generate composite image data having the luminance of the display image data higher than the luminance of the past capture image data. The composition unit 134 may generate composite image data showing borders between the display image data and the past capture image data.

Since the composition unit 134 generates such composite image data, the operator U can recognize that the past capture image data is capture mage data captured in the past. As a result, the operator U can operate the robot 3 assuming that the state shown by the past capture image data can be different from the current state. Therefore, improvement in safety is achieved.

The display control unit 135 displays the composite image data on the display device 21 viewable by the operator U of the robot 3. The display control unit 135, for example, displays the composite image data on the display device 21 in a form which enables distinguishing between the display image data and the past capture image data. The display control unit 135 transmits the composite image data generated by the composition unit 134 to the operation controller 2 through the communication unit 11, to display the composite image data on the display device 21.

Figure 6:
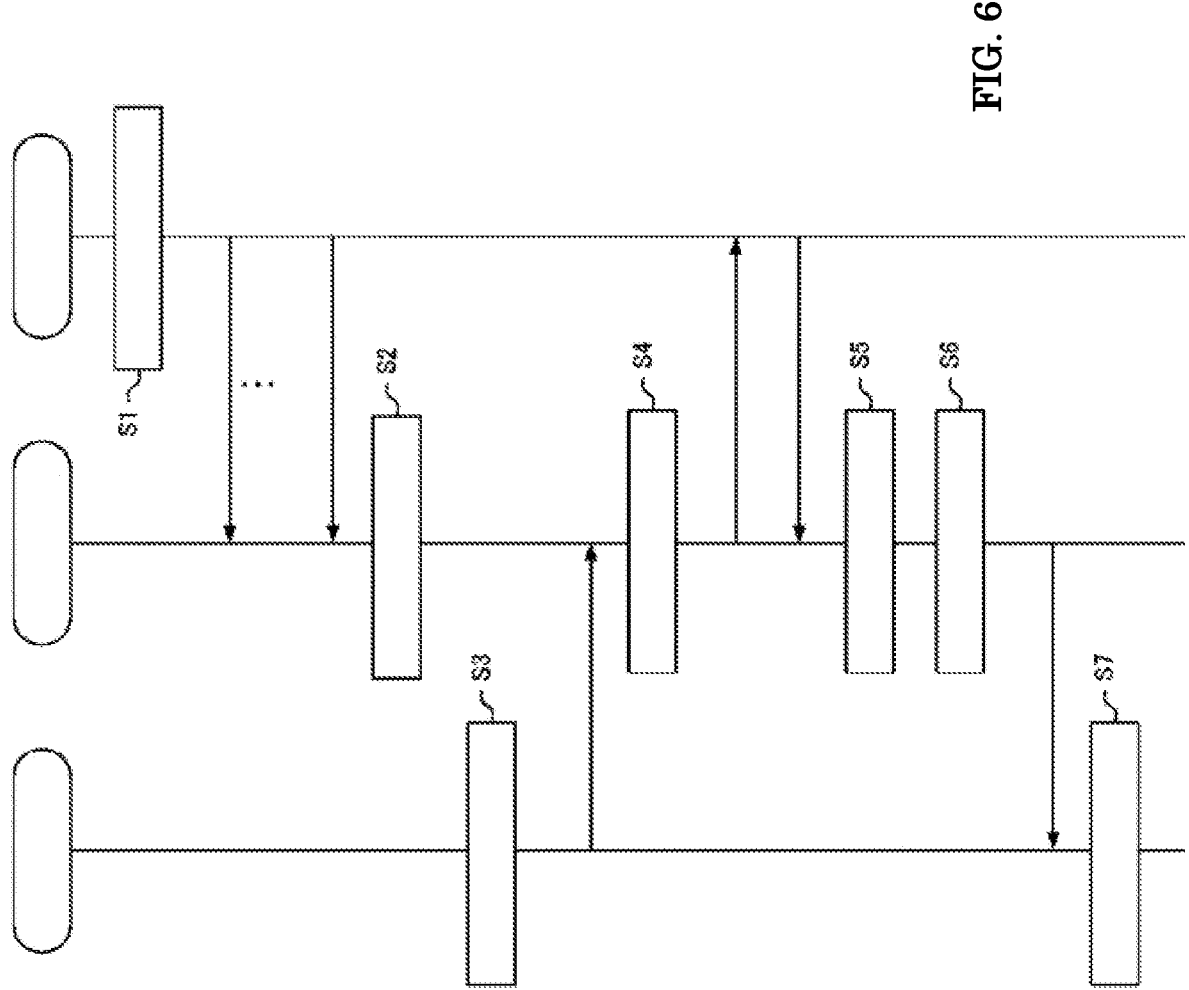
FIG. 6 is a sequence diagram showing the process flow in the data processing system.

FIG. 6 is a sequence diagram showing the process flow in the data processing system S. The sequence diagram shown in FIG. 6 starts from the time point when the robot 3 is turned on.

The robot 3 captures images of the area around the robot 3 using the camera 31 to generate capture image data. For example, the robot 3 generates capture image data corresponding to various angles while switching the angle of the head (S1), associates the capture image data with image capture angle data indicating the angle of the head, and transmits the generated capture image data to the data processing apparatus 1.

The data processing apparatus 1 stores the capture image data received from the robot 3 in the memory unit 12 (S2). For example, the data processing apparatus 1 associates the capture image data with the image capture angle data, and stores the image capture angle data in the memory unit 12 to generate data as shown in FIG. 5.

When the operator U turns on the operation controller 2, and starts operating the robot 3, the operation controller 2 generates operation data (S3), and transmits the generated operation data to the data processing apparatus 1. The control data generation unit 132 generates control data based on the received operation data (S4), and transmits the generated control data to the robot 3.

The robot 3 transmits the capture image data to data processing apparatus 1. The composition unit 134 identifies the angle of the display device 21 or the angle of the head of the robot 3 at the time point when the robot 3 generated the capture image data (S5). Based on the identified angle, the composition unit 134 selects the capture image data generated in the past, stored in the memory unit 12 and combines the latest capture image data obtained from the robot 3 and the capture image data generated in the past, to generate composite image data (S6).

The display control unit 135 transmits the composite image data generated by the composition unit 134 to the operation controller 2. The operation controller 2 displays the received composite image data (S7).

In the above explanation, as an example, the case where the robot 3 generates capture image data corresponding to various angles by switching the angle of the head after the robot 3 is turned on and before the operator U starts operating the robot 3 is illustrated. However, the robot 3 may not need to switch the angle of the head and generate the capture image data before the operator U starts operating the robot 3. In this case, the robot 3 starts generating the capture image data after the operator U starts operating the robot 3.

Until the image data corresponding to various angles are stored in the memory unit 12, the composition unit 134 generates composite image data including only the capture image data immediately after generated by the robot 3 (i.e., real time image data that is not stored in the memory unit 12). Thereafter, when storing of the capture image data in the memory unit 12 is started, the composition unit 134 generates composite image data by combining the image data immediately after the robot 3 generated the capture image data and the past capture image data stored in the memory unit 12. Since the composition unit 134 operates in this manner, the operator U can start working promptly, without the need for the operator U to wait until the data processing apparatus 1 stores the capture image data in the memory unit 12.

Figure 7:
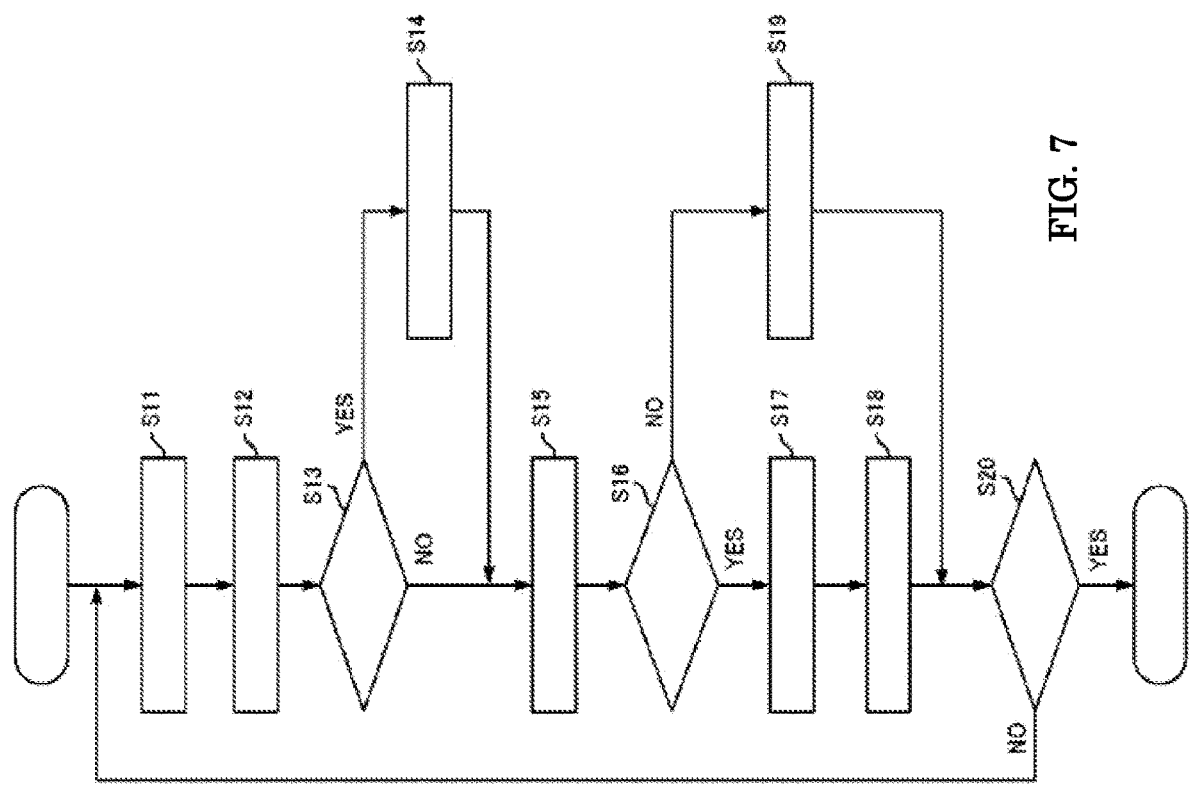
FIG. 7 is a flow chart showing the process flow in the data processing apparatus.

FIG. 7 is a flow chart showing the process flow in the data processing apparatus 1. The process flow shown in FIG. 7 starts from a time point when the operation controller 2 is turned on.

The image data acquisition unit 133 obtains capture image data from the robot 3 through the communication unit 11 (S11). Further, the operation data acquisition unit 131 obtains operation data from the operation controller 2 through the communication unit 11 (S12). The image data acquisition unit 133 obtains the operation data from the operation data acquisition unit 131, and determines whether operation to change the position of the robot 3 is indicated by the operation data (S13). If the image data acquisition unit 133 determines that operation to change the position of the robot 3 has been performed (YES in S13), the image data acquisition unit 133 initializes the past capture image data stored in the memory unit 12 (S14).

If the image data acquisition unit 133 determines that operation to change the position of the robot 3 has not been performed (NO in S13), the image data acquisition unit 133 does not initialize the past capture image data stored in the memory unit 12. Then, the composition unit 134 identifies the device angle of the display device 21 or the angle of the head of the robot 3 at the time point the obtained capture image data was generated, and calculates a plurality of device angles corresponding to the past capture image data to be combined, based on the identified angle (S15).

The composition unit 134 determines whether or not the past capture image data corresponding to the calculated plurality of device angles is stored in the memory unit 12 (S16). If the composition unit 134 determines that past capture image data corresponding to at least one of the plurality of device angles is stored in the memory unit 12 (YES in S16), the composition unit 134 reads the past capture image data corresponding to the device angle from a plurality of pieces of past capture image data stored in the memory unit 12. The composition unit 134 combines the read past capture image data and the capture image data obtained by the image data acquisition unit 133 in S1 to generate composite image data (S17).

If there is a device angle for which there is no past capture image data among the plurality of device angles calculated in S15, the composition unit 134 generates composite image data in which the area corresponding to the device angle has a predetermined pixel value (e.g., a pixel value of black or white). The composition unit 134 transmits the composite image data to the display control unit 135 (S18). If the past capture image data corresponding to all device angles calculated in S15 is not stored in the memory unit 12 (NO in S16), the composition unit 134 does not generate composite image data, and transmits the capture image data obtained by the image data acquisition unit 133 in S11 to the display control unit 135 (S19).

The control unit 13 repeats the process from S11 to S19 until the operator U finishes the operation at the operation controller 2 (NO in S20). When the operator U performed the operation to finish operation (YES in S20), the control unit 13 finishes the process.

In the above description, as an example, the case where the composition unit 134 combines the capture image data corresponding to the area captured by the robot 3 and the past capture image data stored in the memory unit 12 is provided. Alternatively, the composition unit 134 may generate composite image data by combining display image data generated by extracting a portion of the area of the capture image data obtained by the image data acquisition unit 133 and a plurality of pieces of past capture image data corresponding to the area adjacent to the display image data.

Figure 8:
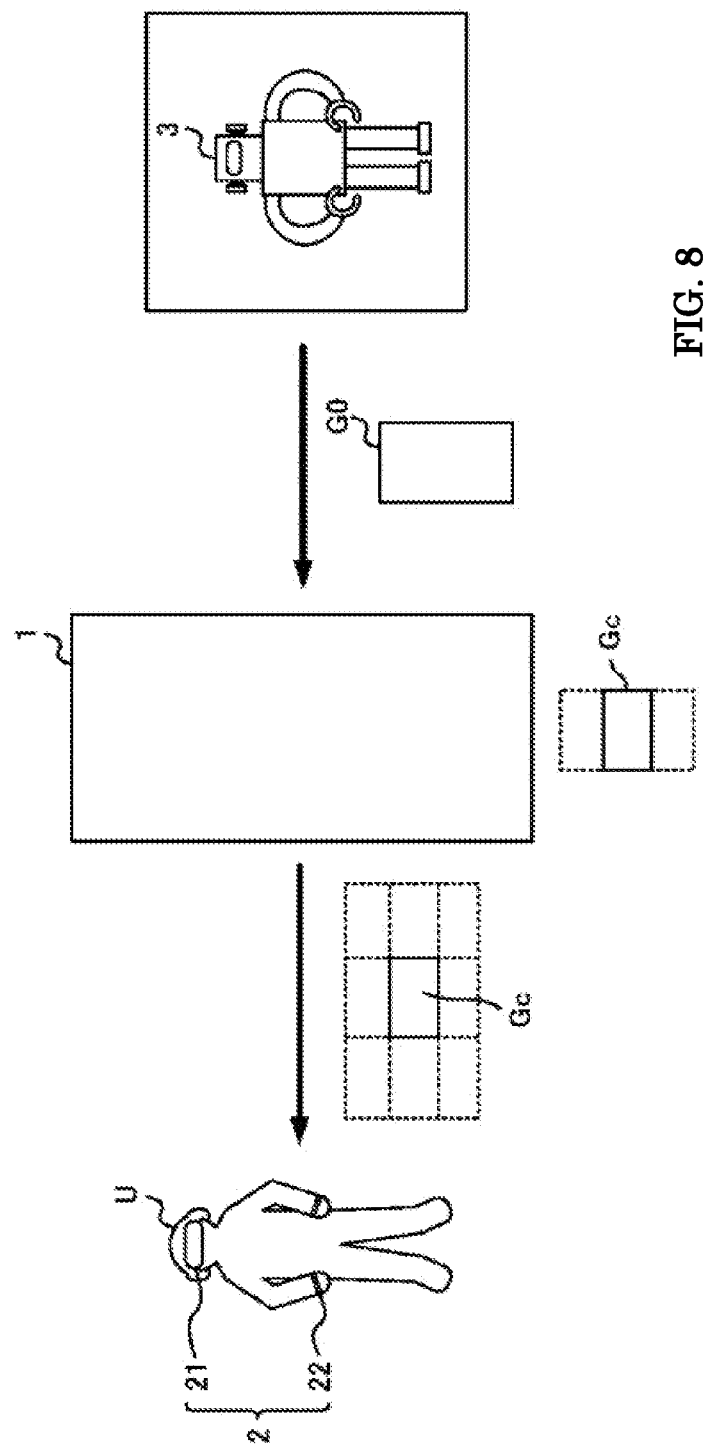
FIG. 8 is a diagram illustrating operation of a data processing apparatus in a first modified embodiment.

FIG. 8 is a diagram illustrating operation of a data processing apparatus 1 in a first modified embodiment. As shown in FIG. 8, the composition unit 134 generates display image data Gc by extracting a predetermined portion of an area of the capture image data G0 obtained from the robot 3. The predetermined portion of the area is, for example, an area including the center position of the image capture area of the capture image data G0, which is highly important for the operator U to operate the robot 3.

The composition unit 134 calculates a plurality of device angles corresponding to a plurality of pieces of past capture image data to be combined with the display image data Gc based on the angle of view of the display image data. The composition unit 134 reads the plurality pieces of past capture image data corresponding to the calculated plurality of device angles from the memory unit 12. Specifically, the composition unit 134 reads the past capture image data adjacent to the display image data in the upward, downward, leftward, rightward, and oblique directions of the display image data Gc generated by extraction from the capture image data, from the memory unit 12. The composition unit 134 combines the display image data Gc and a plurality of pieces of past capture image data read from the memory unit 12 (image data in the area indicated by a broken line in FIG. 8) to generate composite image data.

Since the composition unit 134 extracts a portion of the area of the capture image data G0 obtained from the robot 3 to generate the display image data Gc, the area of the video image data that is switched in real time becomes small, and thus, the composition unit 134 can reduce the data amount of the composite image data. As a result, the delay time in transmitting the composite image data from the data processing apparatus 1 to the operation controller 2 is reduced, and the load on the display process in the operation controller 2 is reduced.

Figure 9:
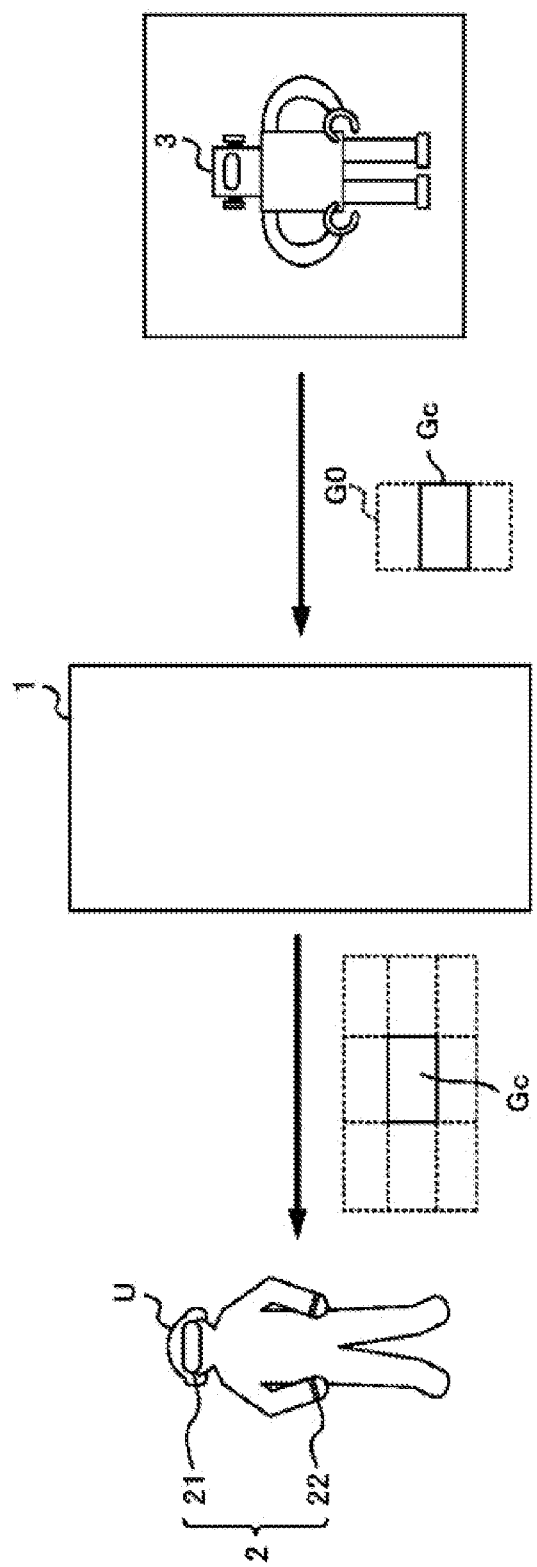
FIG. 9 is a diagram illustrating operation of a data processing apparatus in a second modified embodiment.

FIG. 9 is a diagram illustrating operation of a data processing apparatus 1 in a second modified embodiment. In the above description, as an example, the case where the robot 3 transmits the capture image data G0 generated by the camera directly to the data processing apparatus 1 is provided. Alternatively, the robot 3 may extract a portion of an area of the capture image data G0, and transmits the extracted capture image data Gc to the data processing apparatus 1. In this case, the image data acquisition unit 133 may obtain the capture image data Gc corresponding to a portion of the area captured by the camera.

The robot 3 transmits the extracted capture image data Gc to the data processing apparatus 1. Thus, the amount of data transmitted from the robot 3 to the data processing apparatus 1 is reduced. As a result, it is possible to reduce the delay time until the capture image data is displayed on the display device 21.

In the above description, as an example, the case where the data processing apparatus 1 generates composite image data is provided. Alternatively, the operation controller 2 may store the past capture image data, and has functions of the image data acquisition unit 133 and the composition unit 134. In this case, the operation controller 2 obtains the capture image data transmitted from the robot 3, and selects the past capture image data adjacent to at least any one of the upper side, the lower side, the left side, and the right side of the capture image data, and generates the composite image data by combining the capture image data and the past capture image data, based on the device angle corresponding to the obtained capture data.

In the above description, the display device 21 transmits head operation data indicating the angle of the head of the operator U. Alternatively, the display device 21 may detect the orientation of the viewing direction of the operator U and may transmit head operation data indicating the angle between a reference orientation and the detected orientation of the viewing direction. The reference orientation is an orientation toward the front side of the operator U.

The orientation of the viewing direction of the operator U is determined based on the orientation of the head of the operator U relative to the front side of the operator U and the orientation of the viewing direction of the operator U relative to a direction perpendicular to the display screen of the display device 21. Specifically, the display device 21 calculates the angle between the reference orientation and the orientation of the viewing direction by adding the angle displaced from the orientation of the display device 21 at the time point operation of the display device 21 was started, and the angle between the direction perpendicular to the display screen of the display device 21 and the orientation of the viewing direction. For example, the display device 21 has an angle of 60 degrees between the reference orientation and the orientation of the viewing direction, in the state where the head is turned 90 degrees to the right and the viewing direction is oriented 30 degrees to the left relative to the front side of the display device 21.

When the control data generation unit 132 receives head operation data indicating the angle between the reference orientation and the orientation of the viewing direction, the control data generation unit 132 generates control data using the angle as the angle of the head and transmits the generated control data to the robot 3. The robot 3 changes the angle of the head based on the received control data to enable the camera 31 to generate capture image data around the orientation of the viewing direction of the operator U.

Since the data processing system S has such structure, when the operator U moves the viewing direction, the operator U can view the capture image data in real time suitable for the orientation of the viewing direction, and can view images based on past capture image data around the capture area of the capture image data, further improvement in operability of the data processing system S is achieved.

As described above, in the data processing apparatus 1, the composition unit 134 combines at least a portion of the display image data of the captured image data obtained by the image data acquisition unit 133 at the first time point and a portion of the past capture image data of the captured image data obtained by the image data acquisition unit 133 at the second time point before the first time point to generate composite image data having a wider angle of view than the display image data. Further, the display device 21 displays the image based on the composite image data generated by the composition unit 134.

Since the data processing apparatus 1 and the operation controller 2 are operated in the manner as described above, the operator U can work while viewing an image of an area wider than the area the robot 3 can capture. Thus, improvement in workability and safety is achieved. Moreover, since the data processing system S can reduce the area to be captured by the robot 3, it is also possible to reduce the cost by reducing the area of an imaging element of the robot 3, or improve the resolution by using an imaging element having the same image capture area.

Although the present invention has been described above using the embodiments, the technical scope of the present invention is not limited to the scope described in the above embodiments, and various modifications and changes can be made within the scope of the gist of the present invention. For example, all or part of the apparatus, in any unit, can be configured to be functionally or physically distributed or integrated. Any new form of embodiments derived from any combination of a plurality of embodiments is also encompassed within the embodiments of the present invention. The effect of the new form of embodiment derived from combination of embodiments has the effect of the original embodiments as well.

The invention claimed is:

1. Data processing apparatus comprising a processor, wherein the processor is configured to:
   obtain capture image data generated based on image capturing by an image capture device provided for a robot;
   combine least a portion of display image data of the capture image data obtained at a first time point and at least a portion of past capture image data of the capture image data obtained at a second time point before the first time point to generate composite image data having a wider angle of view than the display image data;
   display the composite image data on a display device viewable by an operator of the robot;
   combine the display image data based on the capture image data generated by image capturing by the image capture device at a first image capture angle and the past capture image data based on the capture image data generated by image capturing by the image capture device at a second image capture angle which is different from the first image capture angle, to generate the composite image data; and
   wherein the data processing apparatus further comprising a memory unit which stores an angle of the display device as a device angle when the capture image data obtained by the processor was captured, and the capture image data associated with the device angle, and
   wherein the processor is further configured to obtain operation data indicating an angle of the display device; and based on relationship between the angle of the display device indicated by the operation data and a plurality of the device angles corresponding to a plurality of pieces of the capture image data stored in the memory unit, the processor selects the past capture image data from the plurality of pieces of capture image data stored in the memory unit.

2. The data processing apparatus according to claim 1, wherein the processor selects the past capture image data corresponding to the device angle which is different from an angle of the display device indicated by the operation data, by an angle corresponding to an angle of view of the display image data.

3. The data processing apparatus according to claim 1, wherein, when the processor obtains the capture image data, the processor updates the capture image data stored in the memory unit which has been associated with an angle of the display device indicated by the operation data at the time point the capture image data was captured, to the capture image data obtained by the processor.

4. The data processing apparatus according to claim 3, wherein, when the position of the robot moves, when the operator finishes control of the robot, or when predetermined time elapses, the processor initializes the capture image data stored in the memory unit.

5. The data processing apparatus according to claim 1, further comprising a memory unit which stores an angle of the capture image device as an image capture angle when the capture image data obtained by the processor was captured, and the capture image data associated with the image capture angle,
   wherein, based on relationship between the first image capture angle and a plurality of the image capture angles corresponding to a plurality of pieces of the capture image data stored in the memory unit, the processor selects the past capture image data from the plurality of pieces of capture image data stored in the memory unit.

6. The data processing apparatus according to claim 5, wherein the processor selects the past capture image data corresponding to the image capture angle which is different from the first image capture angle by an angle corresponding to a view of angle of the display image data.

7. The data processing apparatus according to claim 1, wherein the processor generates the composite image data in a form which enables distinguishing between the display image data and the past capture image data.

8. The data processing apparatus according to claim 1, wherein the processor displays the composite image data on the display device in a form which enables distinguishing between the display image data and the past capture image data.

9. The data processing apparatus according to claim 1, wherein the processor combines the display image data generated by extracting a portion of an area of the capture image data obtained by the processor, and a plurality of pieces of the past capture image data corresponding to an area adjacent to the display image data to generate the composite image data.

10. The data processing apparatus according to claim 1, wherein the processor obtains the capture image data corresponding to a portion of an area captured by the image capture device.

11. A data processing method performed by a processor, the method comprising:
   obtaining a capture image data generated based on image capturing by an image capture device provided for a robot;
   combining at least a portion of display image data of the capture image data obtained at a first time point and at least a portion of past capture image data of the capture image data obtained at a second time point before the first time point to generate composite image data having a wider angle of view than the display image data;
   displaying the composite image data on a display device viewable by an operator of the robot;
   combining the display image data based on the capture image data generated by image capturing by the image capture device at a first image capture angle and the past capture image data based on the capture image data generated by image capturing by the image capture device at a second image capture angle which is different from the first image capture angle, to generate the composite image data; and
   storing an angle of the display device as a device angle when the capture image data obtained by the processor was captured, and the capture image data associated with the device angle, and wherein the processor is further configured to obtain operation data indicating an angle of the display device; and based on relationship between the angle of the display device indicated by the operation data and a plurality of the device angles corresponding to a plurality of pieces of the capture image data stored in the memory unit, the processor selects the past capture image data from the plurality of pieces of capture image data stored in the memory unit.

12. A non-transitory computer program product having computing program instructions wherein the computing program instructions when executed by a computer, configured the computer to:
   obtain a capture image data generated based on image capturing by an image capture device provided for a robot;
   combine at least a portion of display image data of the capture image data obtained at a first time point and at least a portion of past capture image data of the capture image data obtained at a second time point before the first time point to generate composite image data having a wider angle of view than the display image data;
   display the composite image data on a display device viewable by an operator of the robot;
   combining the display image data based on the capture image data generated by image capturing by the image capture device at a first image capture angle and the past capture image data based on the capture image data generated by image capturing by the image capture device at a second image capture angle which is different from the first image capture angle, to generate the composite image data; and
   storing an angle of the display device as a device angle when the capture image data obtained by the computer was captured, and the capture image data associated with the device angle, and wherein the computer is further configured to obtain operation data indicating an angle of the display device; and based on relationship between the angle of the display device indicated by the operation data and a plurality of the device angles corresponding to a plurality of pieces of the capture image data stored in the memory unit, the computer selects the past capture image data from the plurality of pieces of capture image data stored in the memory unit.

13. A data processing system comprising:
   a robot;
   an operation controller configured to transmit operation data indicating content of operation by an operator operating the robot; and
   a data processing apparatus configured to control the robot based on the operation data received from the operation controller,
   wherein the robot comprises:
      an image capture device configured to generate capture image data; and
      an image transmission unit configured to transmit the capture image data to the data processing apparatus,
   the data processing apparatus comprises a processor configured to:
      obtain the capture image data transmitted from the robot;
      combine at least a portion of display image data of the capture image data obtained at a first time point and at least a portion of past capture image data of the capture image data obtained at a second time point before the first time point to generate composite image data having a wider angle of view than the display image data; and
      display the composite image data on a display device viewable by an operator of the robot,
   and wherein the operation controller comprises:
      an operation data transmission unit configured to transmit the operation data based on the content of operation by the operator to the data processing apparatus;
      a display unit configured to display the composite image data transmitted by the data processing apparatus; and wherein the processor is further configured to combine the display image data based on the capture image data generated by image capturing by the image capture device at a first image capture angle and the past capture image data based on the capture image data generated by image capturing by the image capture device at a second image capture angle which is different from the first image capture angle, to generate the composite image data; and wherein the data processing apparatus further comprising a memory unit which stores an angle of the display device as a device angle when the capture image data obtained by the processor was captured, and the capture image data associated with the device angle, and wherein the processor is further configured to obtain operation data indicating an angle of the display device; and based on relationship between the angle of the display device indicated by the operation data and a plurality of the device angles corresponding to a plurality of pieces of the capture image data stored in the memory unit, the processor selects the past capture image data from the plurality of pieces of capture image data stored in the memory unit.

* * * * *